March 8, 1932. J. F. JACKSON 1,848,423
REVERSIBLE SPINDLE DRIVE FOR SPINNING AND TWISTING FRAMES
Filed April 30, 1931
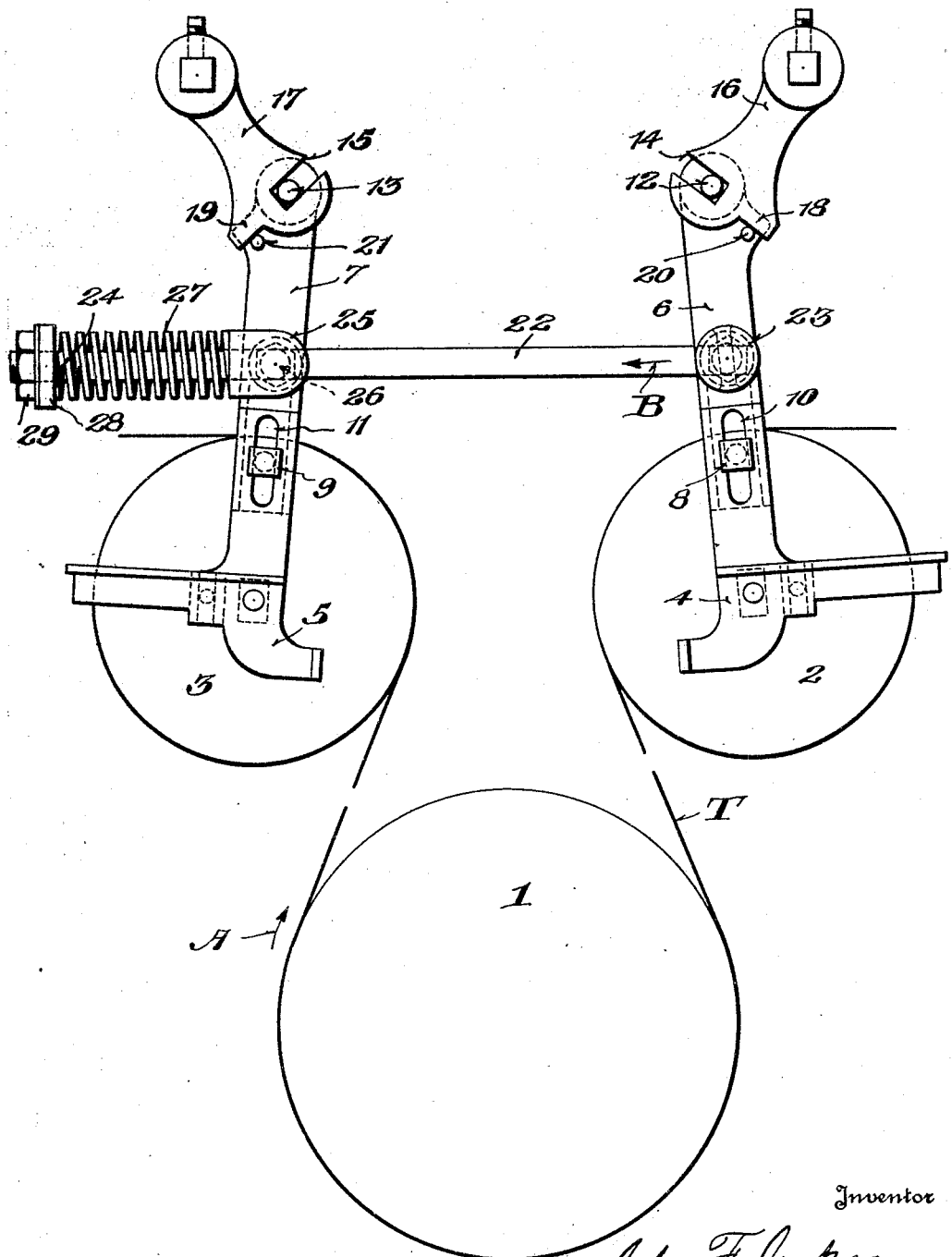
Inventor
John F. Jackson
By Joseph H. Miller
Attorney Patented Mar. 8, 1932

1,848,423

UNITED STATES PATENT OFFICE

JOHN F. JACKSON, OF PAWTUCKET, RHODE ISLAND, ASSIGNOR TO H & B AMERICAN MACHINE CO., OF PAWTUCKET, RHODE ISLAND

REVERSIBLE SPINDLE DRIVE FOR SPINNING AND TWISTING FRAMES

Application filed April 30, 1931. Serial No. 533,968.

This invention relates to reversible spindle drives for spinning and twisting frames and has for its primary object to provide automatic means to take up slack in the driving tape, regardless of the direction of rotation of the machine.

A further object of the invention is to provide means whereby the structure, when once adjusted will require no attention, but which may be readily changed in case the conditions of operation become altered.

A still further object of the invention is to provide a unitary adjustment for both of the two ordinary idler pulleys.

Further objects and advantages will become apparent as the description proceeds, reference being had to the accompanying drawing—in which—

The figure is a side elevation, partly diagrammatic of the device for use in conjunction with the ordinary spinning frame.

In proceeding in accordance with the present invention, a driving pulley 1 is shown which is mounted and actuated in the usual manner.

Idler pulleys 2 and 3 are carried in the usual bearing cradles 4 and 5, and are driven by tape T. The bearing cradles 4 and 5 are adjustably connected to pulley arms 6 and 7 by means of nuts and bolts 8 and 9 which engage in slots 10 and 11 of the pulley arms. The pulley arms 6 and 7 are provided with shafts 12 and 13 at their upper ends to engage in slots 14 and 15 of shaft brackets 16 and 17. The shaft brackets are connected to the frame of the spinning machine (not shown) and serve to support the entire idler structure. At the lower end of the shaft brackets, projections 18 and 19 are formed which latter engage stop pins 20 and 21 carried by the pulley arms 6 and 7 so as to limit the extent of outward movement of the pulley structure relative to the shaft brackets.

The present invention resides principally, in providing a rod 22 which is pivotally connected at one end to the pulley arm 6 by means of a hub and nut structure 23, and which is threaded at its other end, as at 24. The pulley arm 7 is provided with a hollow body 25 which is pivotally secured in place by a nut and bolt 26. A spring 27 bears compressively at one end against the hollow body 25 and at the other end against a washer 28 secured in place by nut 29 threaded on the rod 22.

In operation, and assuming the drive to be in the direction of arrow A, idler puller 2 will tend to move back but will be held in place by engagement of the stop pin 20 with the projection 18 of the shaft bracket 16. This movement takes place against the action of the spring 27 which tends to urge the pulley arm 6 in the direction of the arrow B. The action of the spring 27 on the pulley arm 7 moves the pulley 3 inwardly and takes up whatever slack may occur in the driving tape T. Obviously, if the direction of the drive is reversed, pulley 3 becomes the idler pulley and pulley 2 will act as the tensioning pulley.

Having thus described my invention what I claim as new and desire to secure by Letters Patent is:

1. In a device of the class described, a driving pulley, a tape driven by said pulley, a pair of shaft brackets having outwardly extending projections adjacent their lower ends a pair of pulley arms carried by said shaft brackets, a pair of bearing cradles carried by said pulley arms, a pair of pulleys carried in said bearing cradles and adapted to be driven by said tape, a rod pivotally connected at one of its ends to one of said pulley arms, an abutment member pivotally connected to the other of said pulley arms and receiving the opposite end portion of said rod therethrough, spring means carried by said rod and bearing against said abutment member whereby the pulley arms are urged toward each other, and stop pins carried by said pulley arms for engagement with the projections of said shaft brackets.

2. In a device of the type set forth, a driving pulley, a tape driven by said pulley, a pair of shaft brackets having slotted portions which open outwardly, a pair of arms carrying pulleys engaged with the tape, shafts carried by the arms and received in the slotted portions of the brackets, cooperating stop members carried by the brackets and arms for restricting swinging of the pulley-carrying arms in one direction, and spring means connecting the arms for normally causing the latter to be urged toward one another.

3. In a device of the type set forth, a driving pulley, a tape driven by said pulley, a pair of brackets, a pair of arms carrying pulleys engaged with the tape, means to connect the arms to the brackets for swinging movement, cooperating stop members carried by the brackets and arms for restricting swinging of the pulley-carrying arms in one direction, and spring means connecting the arms for normally causing the latter to be urged toward one another.

In testimony whereof I have signed my name to this specification.

JOHN F. JACKSON.